US011882639B2

(12) United States Patent
Watanabe et al.

(10) Patent No.: US 11,882,639 B2
(45) Date of Patent: Jan. 23, 2024

(54) ILLUMINATION CONTROL SYSTEM (71) Applicant: Panasonic Intellectual Property Management Co., Ltd., Osaka (JP)

(72) Inventors: Kenta Watanabe, Osaka (JP); Yoshihiko Ishida, Kanagawa (JP); Hisao Kataoka, Osaka (JP); Hiroshi Sugimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 17/605,515

(22) PCT Filed: Apr. 21, 2020

(86) PCT No.: PCT/JP2020/017165
§ 371 (c)(1),
(2) Date: Oct. 21, 2021

(87) PCT Pub. No.: WO2020/218281
PCT Pub. Date: Oct. 29, 2020

(65) Prior Publication Data
US 2022/0201822 A1    Jun. 23, 2022

(30) Foreign Application Priority Data
Apr. 24, 2019   (JP) .................. 2019-083362

(51) Int. Cl.
*H05B 47/155*   (2020.01)
*H05B 47/125*   (2020.01)
*H05B 47/175*   (2020.01)

(52) U.S. Cl.
CPC ......... *H05B 47/125* (2020.01); *H05B 47/155* (2020.01); *H05B 47/175* (2020.01)

(58) Field of Classification Search
CPC .. H05B 47/155; H05B 47/175; H05B 47/125; H05B 47/19; Y02B 20/40; F21V 23/00; F21V 33/00; F21S 2/00
See application file for complete search history.

(56) References Cited

U.S. PATENT DOCUMENTS 8,690,362 B2 *   4/2014  Wendt ...................... H04N 9/73
                                                      353/122
9,930,762 B2 *   3/2018  Hirowatari ............. H05B 47/16
(Continued)

FOREIGN PATENT DOCUMENTS

CN      101574019 A      11/2009
CN      102638920 A       8/2012
(Continued)

OTHER PUBLICATIONS

Chinese Office Action with Search Report dated Feb. 18, 2023 issued in the corresponding Chinese Patent Application No. 202080027575.6, with English translation of the Search Report.
(Continued)

Primary Examiner — Haissa Philogene
(74) Attorney, Agent, or Firm — Rimon P.C.

(57) ABSTRACT

An illumination control system includes an illumination device including light sources, and an illumination control device which is capable of individually controlling light emission of the light sources and includes: a measurer which obtains space information regarding a space in which the illumination device is to be installed and position information indicating a position at which the illumination device is to be installed inside the space; an information transmitter which transmits control information to the illumination device; and an information processor which optimizes control information for controlling a lighting mode of each of the light sources, according to an installation condition of
(Continued)

the illumination device indicated in the space information and the position information.

12 Claims, 5 Drawing Sheets

(56) References Cited

U.S. PATENT DOCUMENTS

| | | | |
|---|---|---|---|
| 10,143,068 B2* | 11/2018 | Karc | G05F 1/66 |
| 10,512,143 B1* | 12/2019 | Ikehara | H04L 61/5038 |
| 10,982,825 B2* | 4/2021 | Haas | F21L 2/00 |
| 2011/0316426 A1 | 12/2011 | Iwanami et al. | |
| 2012/0200660 A1 | 8/2012 | Verthein et al. | |

FOREIGN PATENT DOCUMENTS

| | | |
|---|---|---|
| CN | 105307319 A | 2/2016 |
| JP | 2012-216300 A | 11/2012 |

OTHER PUBLICATIONS

International Search Report issued in corresponding International Patent Application No. PCT/JP2020/017165, dated Jul. 14, 2020, with English translation.

* cited by examiner

ILLUMINATION CONTROL SYSTEM

CROSS-REFERENCE OF RELATED APPLICATIONS

This application is the U.S. National Phase under 35 U.S.C. § 371 of International Patent Application No. PCT/JP2020/017165, filed on Apr. 21, 2020, which in turn claims the benefit of Japanese Application No. 2019-083362, filed on Apr. 24, 2019, the entire disclosures of which Applications are incorporated by reference herein.

Technical Field

The present disclosure relates to an illumination control system.

Background Art

There has been disclosed an illumination device including a main control device which outputs a control signal corresponding to an illumination scene and a light emission diode which performs light control in accordance with the control signal (see Patent Literature (PTL) 1).

CITATION LIST

Patent Literature

[PTL 1] Japanese Unexamined Patent Application Publication No. 2012-216300

SUMMARY OF INVENTION

Technical Problem

With a conventional illumination device, for example, in a case where the illumination device is installed in a room, there is a case where a desired illumination indicated by a control signal cannot be provided in some environments of the room even when the illumination device is turned on in accordance with the control signal.

In view of this, the present disclosure has an object to provide an illumination control system in which, even when an illumination device is installed in spaces having different installation conditions, the illumination device can perform the same illumination in such spaces.

Solution to Problem

In order to achieve the aforementioned object, an aspect of an illumination control system according to the present disclosure includes: an illumination device including a plurality of light sources; and an illumination control device capable of individually controlling light emission of the plurality of light sources, the illumination control device including: an information obtainer which obtains space information regarding a space in which the illumination device is to be installed and position information indicating a position at which the illumination device is to be installed inside the space; an information transmitter which transmits control information to the illumination device; and an information processor which optimizes control information for controlling a lighting mode of each of the plurality of light sources, according to an installation condition of the illumination device indicated in the space information and the position information.

Advantageous Effects of Invention

According to the illumination control system according to the present disclosure, even when an illumination device is installed in spaces having different installation conditions, the illumination device can perform the same illumination in such spaces.

DESCRIPTION OF EMBODIMENTS

Hereinafter, embodiments of the present disclosure will be described with reference to the drawings. It should be noted that each of the subsequently described embodiments shows a specific example of the present disclosure. Therefore, numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in the independent claims are described as optional structural components.

Each of the figures are schematic diagrams and are not necessarily precise illustrations. Therefore, for example, the scaling, etc., in the respective figures are not exactly uniform. Furthermore, in the figures, structural elements that are substantially the same are given the same reference signs, and overlapping description is omitted or simplified.

Furthermore, in the subsequent embodiment, expressions such as approximately spherical are used. For example, approximately spherical means, not only perfectly spherical, but also substantially spherical, that is, including error of about several percent. Furthermore, approximately spherical means sphere-shaped within a range that enables the advantageous effects of the present disclosure to be produced. The same is true for other expressions using "approximately".

An illumination control system according to an embodiment will be described below.

Embodiment

Figure 1:
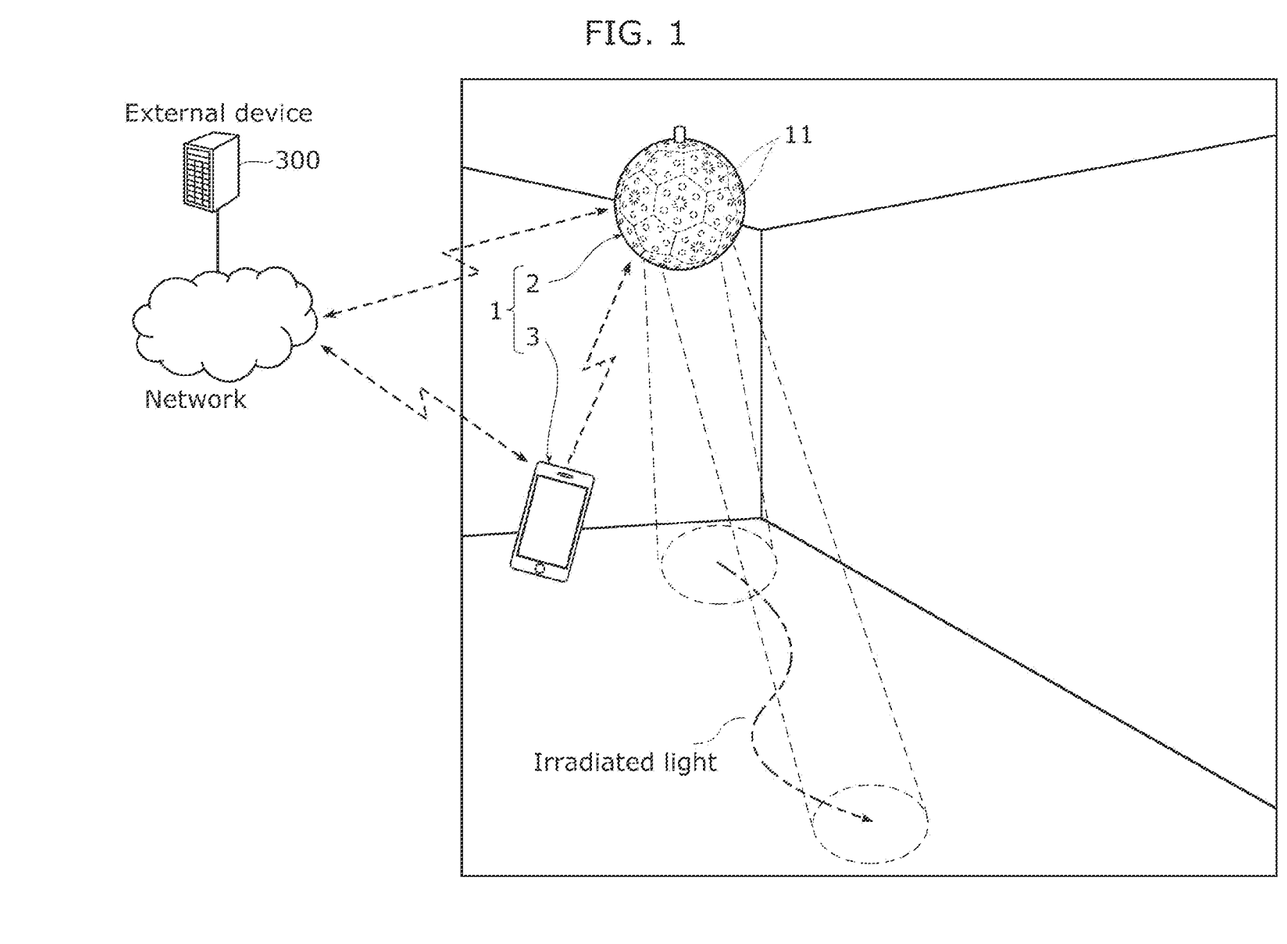
FIG. 1 is a perspective view of an example of an outline of an illumination control system according to an embodiment.

[Configuration]
[Illumination Control System 1]
FIG. 1 is a diagram illustrating an example of an outline of illumination control system 1 according to an embodiment.

As illustrated in FIG. 1, illumination control system 1 is a system which obtains control information and thereby can control an illumination mode of illumination device 2 such as lighting and extinguishing, illuminating (radiating) direction, brightness and light color, in accordance with the control information obtained. Illumination control system 1 obtains the control information by inputting the control information into illumination control device 3 and obtains the control information from external device 300. External device 300 is an illumination device other than illumination device 2 and illumination control device 3, a server apparatus, or the like and is capable of communicating with communicator 230 of illumination control device 3 and illumination device 2 over a network. External device 300 receives control information transmitted from illumination control device 3 over the network.

Illumination control system 1 includes illumination device 2 and illumination control device 3.

[Illumination Device 2]

Illumination device 2 is installed on, for example, an interior ceiling of a building. Illumination device 2 is a light fixture which radiates light (illuminates) in all directions, 360°, with a plurality of light sources 11 which illuminate in respective directions; illumination device 2 includes the plurality of light sources 11. The plurality of light sources 11 are arranged across illumination device 2. An external shape of illumination device 2 is, for example, approximately spherical or approximately polyhedral. Although the light fixture which radiates light in all directions is exemplified as illumination device 2 in the present embodiment, it is noted that illumination device 2 is not limited to the light fixture and may be a light fixture such as a ceiling light and a downlight.

Illumination device 2 radiates light in an optional direction from illumination device 2 as a center by selectively causing the plurality of light sources 11 to emit light. That is, an illumination direction of the light emitted from illumination device 2 is optional. For example, illumination device 2 radiates in all directions, 360°, by causing all light sources 11 to emit light simultaneously and radiates only in a certain direction by causing some light sources 11 of the plurality of light sources 11 to emit light. That is, illumination device 2 not only functions as a 360°-omnidirectional light but also functions as a spotlight.

As illustrated by broken lines and chain double-dashed lines in FIG. 1, illumination device 2 functions as a spotlight and selectively causes the plurality of light sources 11 to emit light such that radiated light moves. In this case, in FIG. 1, the plurality of light sources 11 are selectively caused to emit light such that a shape of an irradiated region on a wall surface is approximately circular, but the shape is not limited to a shape being approximately circular. For example, the shape of the irradiated region of illumination device 2 may be rectangular or approximately elliptic.

In addition, illumination device 2 has a light controlling function and a color controlling function. Specifically, illumination device 2 changes a brightness and a light color (color temperature or color) of light emitted by illumination device 2. In the present embodiment, illumination device 2 changes a brightness and a light color of light for each of the plurality of light sources 11.

In addition, illumination device 2 in the present embodiment radiates light onto an object such as a wall surface uniformly in full color. For this purpose, light sources 11 each include an RGB three-color light source. In addition, the plurality of light sources 11 are arranged in a uniformly and evenly distributed manner at a high density. With this arrangement, presentation of a space in which illumination device 2 is installed is made by controlling light radiated by illumination device 2.

Unlike a display for displaying an image, illumination device 2 in the present embodiment is required to irradiate a wall surface and the like, and thus light sources 11 are required to output high power light. For this purpose, a luminance of one light source 11 is high as compared with a light emitting diode (LED) light source used as a backlight of a liquid crystal display or an LED light source used for an LED display.

A configuration of illumination device 2 in the present embodiment will be described.

Figure 2:
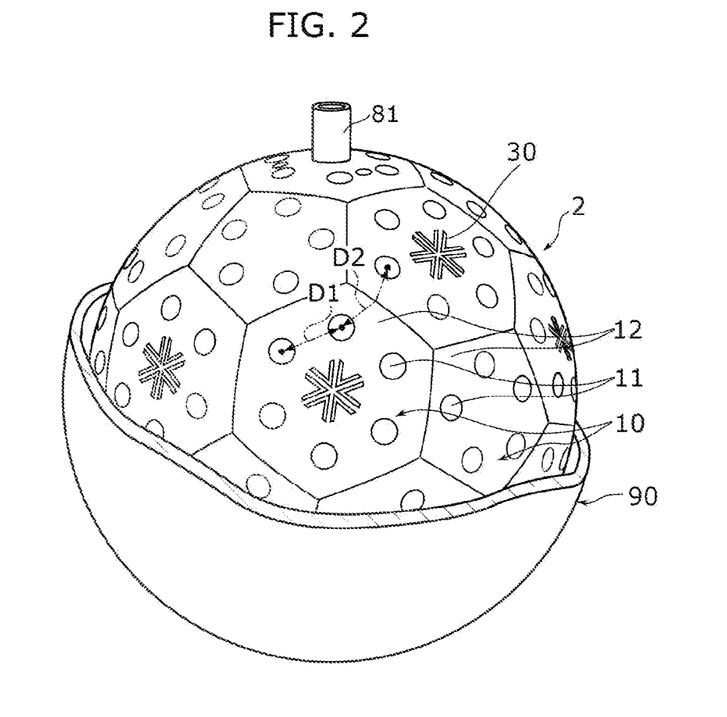
FIG. 2 is a perspective view of an illumination device of the illumination system illustrated in FIG. 1, with part of a cover removed.
Figure 3:
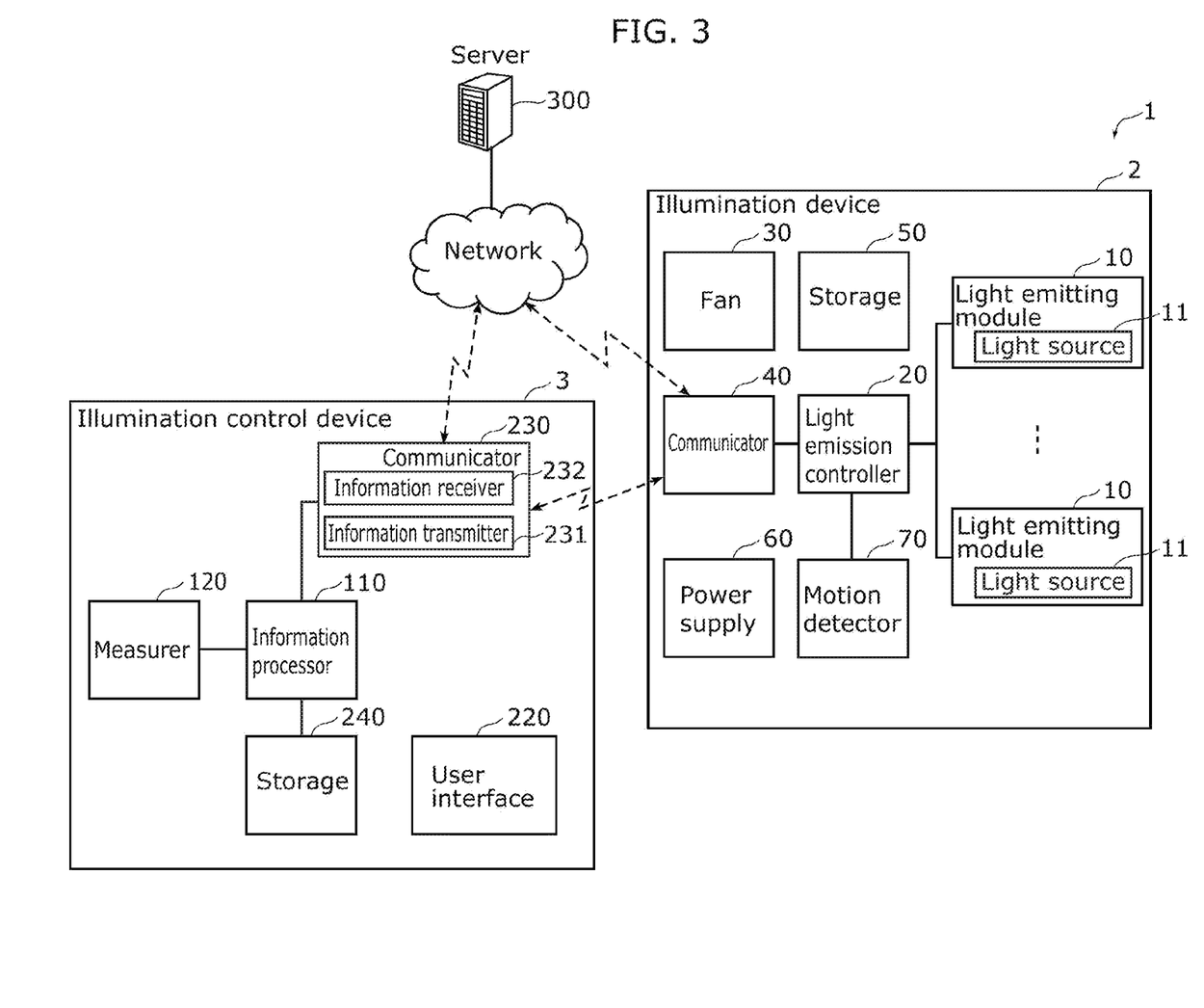
FIG. 3 is a block diagram illustrating a configuration of the illumination control system according to the embodiment.

FIG. 2 is a perspective view of illumination device 2 illustrated in FIG. 1, illustrating a state where cover 90 is partly removed. FIG. 3 is a block diagram illustrating a configuration of illumination control system 1 according to the embodiment.

As illustrated in FIG. 2 and FIG. 3, illumination device 2 includes a plurality of light emitting modules 10, light emission controller 20, motion detector 70, storage 50, fan 30, communicator 40, power supply 60, and cover 90.

<Light Emitting Module 10>

The plurality of light emitting modules 10 are each a module which includes at least one light source 11. In the present embodiment, light emitting modules 10 each include a plurality of light sources 11. Light sources 11 each emit light in a predetermined light emission mode in accordance with an instruction from light emission controller 20 based on control information from illumination control device 3.

The plurality of light emitting modules 10 are arranged forming an approximately spherical or polyhedral external shape. In the present embodiment, the plurality of light emitting modules 10 form an external shape of an icosidodecahedron having 60 vertices. That is, in the present embodiment, 32 light emitting modules 10 are provided. The plurality of light emitting modules 10 include 20 regular-hexagonal light emitting modules 10 and 12 regular-pentagonal light emitting modules 10.

The plurality of light emitting modules 10 each include light sources 11 and board 12.

The plurality of light sources 11 are arranged across illumination device 2. That is, the plurality of light sources 11 are scattered such that illumination device 2 can radiate light in all directions. Light sources 11 illuminate respective directions. Directions of light beams emitted by respective light sources 11 may be different from one another. The plurality of light sources 11 each emit light outward from illumination device 2. Specifically, an optical axis of each light source 11 is in a direction perpendicular to a tangential line of an outer surface of cover 90. The optical axis is a line along a main beam of light emitted from each light source 11.

In addition, light sources 11 each emit light of two or more colors. Specifically, light sources 11 are each an RGB three-color light source which emits monochromatic light beams of three colors, red light, blue light, and green light, and emits color light or white light which is obtained by controlling the monochromatic light beams of these three colors.

Specifically, light sources 11 are each a surface-mount-device (SMD) type LED device including a packaged LED and each include a container (package), a plurality of LED chips mounted in the container, and a sealing member which seal the plurality of LED chips. In the present embodiment, as the plurality of LED chips, a red LED chip which emits red light, a blue LED chip which emits blue light, and a green LED chip which emits green light. The sealing member is made of a translucent insulating resin material such as silicone resin. Note that optical diffuser such as silica, filler, and the like may be dispersed in the sealing member.

As illustrated in FIG. 2, light sources 11 configured in the above manner are mounted on boards 12. In the present embodiment, a plurality of light sources 11 are mounted in one board 12. When illumination device 2 is viewed as a whole, the plurality of light sources 11 are arranged at specified intervals. In addition, light sources 11 mounted in each board 12 are arranged at specified intervals. When illumination device 2 is viewed as a whole, an interval between two adjacent light sources 11 among the plurality of light sources 11 (as an example, D1 and D2 are illustrated in FIG. 2) is at most twice an average interval which is an average of all intervals between two adjacent light sources 11 among the plurality of light sources 11 and at least half the average interval. Note that the interval between two adjacent light sources 12 among the plurality of light sources 11 is at most twice and at least half the average interval which is the average of all intervals between two adjacent light sources 11 among the plurality of light sources 11 which are arranged at least along a specified direction on mounting surfaces of a plurality of boards 12 forming illumination device 2.

Boards 12 are mounting boards each including a mounting surface on which light sources 11 are to be mounted. Although not illustrated, on the mounting surface of board 12, metal wiring, a connector for power supply, and the like are provided. In the present embodiment, by electrically connecting connectors of boards 12 to one another, the plurality of boards 12 are electrically connected to light emission controller 20 with one wire.

A shape of each board 12 has rotational symmetry. That is, the shape of each board 12 is circular, polygonal, or the like. In the present embodiment, boards 12 each have a shape which corresponds to a polygonal surface forming a part of the approximately polyhedral outer surface of a housing. Boards 12 include boards 12 each having a regular-hexagonal shape in plan view and boards 12 each having a regular-pentagonal shape in plan view. Twenty regular-hexagonal boards 12 and twelve pentagonal boards 12 are assembled into a polyhedron which is an icosidodecahedron. As above, illumination device 2 is formed to be approximately spherical or polyhedral with the plurality of boards 12.

Boards 12 are attached to a polyhedral housing not illustrated with fixing members such as screws, so as to be fixed to the housing. In the present embodiment, the housing is an icosidodecahedron. Accordingly, the housing causes the plurality of light emitting modules 10 to form a shape of an icosidodecahedron.

On board 12, a plurality of light sources 11 are arranged regularly. In the present embodiment, in each regular-hexagonal board 12, light sources 11 (six in total) are mounted at corner portions of the regular hexagon, and in each regular-pentagonal board 12, light source 11 (five in total) are mounted at corner portions of the regular pentagon. Illumination device 2 therefore includes 180 (=20×6+12×5) light sources 11.

For boards 12, for example, a metallic board produced by applying an insulation coating to base material made of metallic material such as aluminum and copper, a ceramic board which is a sintered body of ceramic material such as alumina, a resin board made of resin material, or the like is used. In the present embodiment, a printed circuit board which includes a glass epoxy board on which metal wiring is formed is used for boards 12. Although boards 12 are rigid boards, they may be flexible boards.

<Light Emission Controller 20>

Light emission controller 20 is a control circuit which controls components of illumination device 2. Light emission controller 20 performs various kinds of control by, for example, a processor executing a program stored in storage 50. The processor includes a micro processing unit (MPU), a central processing unit (CPU), a digital signal processor (DSP), a graphical processing unit (GPU), a system on a chip (SOC), or the like.

Light emission controller 20 controls the plurality of light emitting modules 10. Specifically, light emission controller 20 obtains (receives) control information from illumination control device 3 and controls light emission modes of light beams emitted by light sources 11 included in each light emitting module 10 such that light sources 11 are turned on in their respective light emission modes corresponding to the control information obtained. That is, light emission controller 20 individually controls light emission modes of light beams emitted by all light sources 11 included in illumination device 2. For example, light emission controller 20 performs the controls in such a manner as to control lighting and extinguishing (turning on or turning off) of light beams emitted by all light emitting modules 10, change brightnesses of the light beams, and change colors of the light beams.

In addition, light emission controller 20 individually controls light emission modes of light emitting modules 10 in accordance with the control information received from illumination control device 3.

Here, the control information includes identifiers of light sources 11 to be caused to emit light beams, colors of the light beams to be emitted by light sources 11, durations of light emissions by light sources 11, and the like. That is, the control information includes information for turning on each light source 11 in a predetermined light emission mode (a color of light to be emitted by light source 11, a duration of light emission by light source 11, and the like). In addition, the control information includes a plurality of light emission steps in each of which each light source 11 is caused to be turned on in a predetermined light emission mode.

Light emission controller 20 also controls the light emission mode of each light source 11 based on a detection result obtained from motion detector 70.

<Motion Detector 70>

Motion detector 70 is a sensor which always detects a user who is present around illumination device 2. Motion detector 70 not only simply detects presence of a user but also detects a position of the user, an attitude of the user, a behavior of the user, and the like.

Motion detector 70 outputs a detection result indicating a detected behavior of a user to light emission controller 20. Motion detector 70 is, for example, an image capturing device such as an infrared sensor and a time-of-flight (TOF) camera. Note that motion detector 70 may be installed in illumination device 2, but motion detector 70 need not be installed in illumination device 2 and may be provided at a location other than illumination device 2.

<Storage 50>

Storage 50 saves the detection result from motion detector 70 in a form of a database regarding a user. That is, storage 50 saves behavior records of the user. In addition, storage 50 periodically saves control information and the like obtained by light emission controller 20 over the network. Storage 50 may store a table including items associated with actions of a user.

Storage 50 can be used as a working memory for light emission controller 20. Storage 50 includes a primary storage device such as a random-access memory (RAM) and a read only memory (ROM). In addition, storage 50 may include a secondary storage device such as a hard disk drive (HDD) and a solid-state drive (SSD) and/or a tertiary storage device such as an optical disk and an SD card. Note that storage 50 may include another storage device.

<Fan 30>

Fan 30 is a blower fan which air-cools an inside of illumination device 2. When driven, fan 30 takes ambient air into the inside through one air hole among a plurality of air holes and discharges hot air through the other air holes. Fan 30 may be configured to be automatically turned ON/OFF in conjunction with turning on or turning off of light sources 11, may be configured to be controlled to be turned ON/OFF in accordance with an operation by illumination control device 3, or may include both of these functions.

<Communicator 40>

Communicator 40 has a function of communicating with illumination control device 3. Specifically, communicator 40 receives control information for controlling an illumination mode of light of illumination device 2, from illumination control device 3. The control information received by communicator 40 is outputted to light emission controller 20. A method for communication by communicator 40 is, for example, a communication method such as wide area network (WAN), local area network (LAN), power line communication, infrared communication, near field communication (e.g., Bluetooth (R) communication), and mobile communication for cellular phones.

<Power Supply 60>

Power supply 60 has a function of supplying electric power to components of illumination device 2. Power supply 60 is, for example, a power supply circuit including a printed board on which a plurality of electronic components are mounted. For example, power supply 60 generates driving electric power for causing the plurality of light emitting modules 10 to emit light beams. Specifically, power supply 60 generates driving electric power for causing light sources 11 to emit light beams and supplies the driving electric power to light sources 11. For example, when illumination device 2 is connected to a commercial AC power supply with an attachment plug or the like, power supply 60 converts AC power into the driving electric power. As an example, power supply 60 converts commercial AC power into DC power and supplies the DC power to light sources 11 as the driving electric power for causing light sources 11 to emit light beams. Light sources 11 are thereby caused to emit light beams. Note that power supply 60 also generates driving electric power for driving fan 30.

<Cover 90>

As illustrated in FIG. 2, cover 90 is formed from a translucent member of resin material having translucency such as transparent resin or of transparent glass material. Cover 90 is supported by wiring pipe 81. Cover 90 has transmitting characteristics and scattering characteristics and transmits and scatters light beams emitted from light emitting modules 10. Cover 90 is formed such that all the plurality of light emitting modules 10 arranged in an approximately polyhedral or approximately spherical shape are covered as a whole with cover 90. Cover 90 is an outer-shell housing which is located at an outermost location of illumination device 2. Cover 90 has an approximately spherical shape.

[Illumination Control Device 3]

Illumination control device 3 is a device which controls illumination device 2. For example, illumination control device 3 is a portable terminal such as a smartphone and a tablet terminal, a personal computer, or the like operated by a user. In addition, illumination control device 3 may be a terminal which enables operation of equipment other than illumination device 2 or may be a terminal such as a dedicated remote control for operating only illumination device 2.

When receiving an operation by a user, illumination control device 3 controls a light emission mode such as lighting and extinguishing, brightness, light color, duration of light emission, and the like for each of the plurality of light sources 11. In this way, illumination control device 3 changes an illumination mode of illumination device 2. Note that this does not limit the light emission mode of each light source 11, and the light emission mode may include a light emission pattern of turning on and off or the like.

For example, to control an illumination direction of light emitted from illumination device 2, a user operates illumination control device 3 to specify the illumination direction of the light of illumination device 2. This causes illumination control device 3 to transmit information including the specified illumination direction to illumination device 2. Illumination device 2 selects one or more light sources 11 which are able to illuminate the specified illumination direction from among all light sources 11 and causes these light sources 11 to emit light beams.

Illumination control device 3 includes measurer 120, information processor 110, user interface 220, communicator 230, and storage 240.

<Measurer 120>

Measurer 120 is, for example, a camera or the like which captures an image of illumination device 2. Measurer 120 measures (captures an image in the present embodiment) illumination device 2 radiating light to check whether a desired illumination is being provided when illumination device 2 is turned on based on control information. Measurer 120 is an example of an information obtainer.

In the present embodiment, when light sources 11 of illumination device 2 are turned on based on the control information, measurer 120 measures a space which illumination device 2 illuminates. An image measured by measurer 120 includes a brightness, a tone (for example, RGB values), and the like of light with which an object forming the space is irradiated. By measuring the space and illumination device 2 with measurer 120 in a state where light sources 11 are caused to emit light beams, an image captured for measuring allows an illumination state in which the space is illuminated to be recognized. Here, a light emission mode of each light source 11 includes a presented tone (e.g., RGB values), a brightness (luminance), or the like.

The space mentioned here is, for example, an actual space formed with building materials which serve as a floor, a ceiling, a side wall, and the like to constitute a room and with an object installed on the building material, such as an article of furniture. In the present embodiment, when the space is mentioned as simple as a space, the space means the actual space. It is appreciated that the concept of a space includes a shape and a size which define the space.

Measurer 120 measures illumination device 2 and a space in which illumination device 2 is to be installed, so as to obtain space information regarding the space in which illumination device 2 is to be installed and position information indicating a position at which illumination device 2 is to be installed inside the space. Specifically, measurer 120 measures a space in which illumination device 2 is installed, that is, measures an object forming the space to calculate a shape, a size, and the like of the space, generating the space information indicating the calculated shape, size, and the like of the space. In addition, measurer 120 measures illumination device 2 installed in the space and, based on a measured image, calculates a position at which illumination device 2 installed in the space, that is, three-dimensional coordinates to generate the position information. Measurer 120 outputs the generated space information and position information to information processor 110.

Measurer 120 is installed in illumination control device 3, but the installation is not limited to this. Measurer 120 may be installed in illumination device 2 or may be a separate device independent of illumination device 2 and illumination control device 3.

In addition, based on control information optimized by information processor 110 (equivalent to control information subjected to first correction described later), measurer 120 measures an illumination state of a case where illumination device 2 installed at the position indicated in the position information is turned on (equivalent to a second illumination state after the first correction described later), thereby generates the second illumination state, and obtains information indicating the second illumination state, which will be described later. That is, by measuring an illuminated space when illumination device 2 is turned on based on the corrected control information, measurer 120 generates the information indicating the second illumination state (indicating a second illumination state based on the control information subjected to the first correction described later). Here, the illumination state indicates a state including a brightness, a tone, and the like of a space illuminated by illumination device 2, more specifically, of an irradiated surface of an object which is irradiated with light.

<Information Processor 110>

Information processor 110 is a control circuit which controls components of illumination control device 3. Information processor 110 performs various kinds of control by, for example, a processor executing a program stored in storage 240. The processor includes a micro processing unit (MPU), a central processing unit (CPU), a digital signal processor (DSP), a graphical processing unit (GPU), a system on a chip (SOC), or the like.

In the present embodiment, information processor 110 brings about a state where measurer 120 is ready to start measurement, based on an instruction from a user received by user interface 220.

Information processor 110 obtains the space information and the position information from measurer 120. Although the space information and the position information are obtained from measurer 120 in the present embodiment, information processor 110 may obtain the space information and the position information by inputting the space information and the position information into user interface 220 or may obtain the space information and the positional information via communicator 230 from external device 300.

In addition, information processor 110 optimizes control information for controlling a lighting mode in which light source 11 is caused to emit light, in accordance with an installation condition of illumination device 2 indicated in the space information and the position information. That is, in a case where illumination by illumination device 2 based on the control information is presented differently from a desired illumination due to an ambient environment, information processor 110 corrects the control information such that the illumination by illumination device 2 matches or resembles the desired illumination. The means for optimizing the control information will be described specifically below. In the present embodiment, the control information is optimized by correcting the control information in two steps.

First, the first correction will be described.

Information processor 110 generates virtual space data including a virtual space which simulates the space in which illumination device 2 is to be installed based on the obtained space information and including a virtual illumination device which is installed in the virtual space based on the obtained position information. Here, the virtual space is a space defined by a virtual object and is different from the actual space. Examples of the virtual object include a virtual ceiling, a virtual floor, a virtual side wall forming the virtual space, and virtual equipment or the like arranged on them.

Specifically, information processor 110 generates the virtual space simulating the space in which illumination device 2 is installed, based on a shape and a size of the space and a size and a position of an object forming the space, and the like indicated in the space information. The virtual space is formed similarly to the actual space in which an actual illumination device 2 is to be installed. Information processor 110 generates the virtual space data which is data representing the virtual illumination device installed at the position indicated in the position information in the generated virtual space.

Information processor 110 runs software which generates the virtual space data. Such software is stored in storage 240.

In addition, information processor 110 further calculates a first illumination state of light radiated from the virtual illumination device onto an irradiated surface of the virtual object based on the generated virtual space data and generates information indicating the calculated first illumination state of the light radiated onto the irradiated surface. That is, to provide the desired illumination, information processor 110 generates information indicating the first illumination state serving as master data which simulates the virtual illumination device turned on in the virtual space based on the control information. Information processor 110 further generates information indicating a second illumination state of a case where illumination device 2 installed at the position indicated in the position information is turned on based on the control information (the second illumination state before the correction). Information processor 110 compares the information indicating the second illumination state before the correction with the information indicating the first illumination state and corrects the control information such that the information indicating the second illumination state matches the information indicating the first illumination state, that is, such that a difference between the second illumination state and the first illumination state becomes small (the first correction), thereby optimizing the control information. This makes the second illumination state after the correction based on the optimized control information (the second illumination state based on the control information subjected to the first correction and will be referred to as a second illumination state after the first correction) substantially matches the first illumination state. Information processor 110 transmits the control information subjected to the first correction (the optimized control information) to illumination device 2. When illumination device 2 obtains the control information subjected to the first correction and is turned on based on the obtained control information, the space is brought into the second illumination state after the first correction.

In the first correction, the following may be performed.

In the first correction, measurer 120 generates information which brings about a state indicating a third illumination state of a case where illumination device 2 installed at a specified position in a specified space is turned on based on the control information. Information processor 110 obtains the information which brings about the state indicating the third illumination state, from measurer 120, and compares the obtained information indicating the third illumination state with the information indicating the second illumination state. Information processor 110 corrects the control information with which the second illumination state before the correction is presented such that the information indicating the third illumination state matches the information indicating the second illumination state, that is, such that the third illumination state matches the second illumination state; that is, information processor 110 performs the first correction. The control information is thereby optimized, making the second illumination state after the first correction based on the optimized control information substantially matches the third illumination state. The term "specified space" herein refers to an actual specified space.

In addition, in the present embodiment, information processor 110 uses inverse-square law to correct the control information with which the second illumination state before the correction is presented such that a difference between the second illumination state before the correction and the first illumination state or the third illumination state becomes small (is minimized).

Note that, in the first correction, the generation of the information indicating the second illumination state and the information bringing about the third illumination state may be performed with dedicated software installed in a personal computer or the like. In addition, the information indicating the second illumination state and the information bringing about the third illumination state may be generated by measuring, by measurer 120, a case where illumination device 2 presents the second illumination state and a case where illumination device 2 presents the third illumination state.

Next, second correction will be described.

Information processor 110 obtains the information indicating the second illumination state of the space based on the control information subjected to the first correction, from measurer 120. Information processor 110 calculates the difference between the second illumination state indicated in the information indicating the second illumination state and the first illumination state or the third illumination state.

In the present embodiment, information processor 110 compares an illumination state of a case where illumination device 2 is turned on based on the control information subjected to the first correction, that is, the second illumination state after the correction, with the first illumination state indicated in the information indicating the first illumination state which is virtually generated by the simulation. Information processor 110 calculates a difference between the second illumination state after the first correction and the first illumination state, which is a result of the comparison. Specifically, the difference here refers to differences between a brightness, a tone, and the like indicated by the second illumination state after the first correction and a brightness, a tone, and the like indicated by the first illumination state.

Information processor 110 optimizes the control information such that the calculated difference becomes zero. That is, information processor 110 further corrects the control information subjected to the first correction such that the second illumination state resembles or matches the first illumination state; that is, information processor 110 performs the second correction. For example, in the second correction, the control information subjected to the correction is further corrected in accordance with a texture or the like which is defined based on a material or the like of the object forming the space. The second illumination state based on the control information subjected to the first correction thereby resembles or matches the first illumination state.

Additionally, in another example of the present embodiment, information processor 110 may compare the illumination state of the case where illumination device 2 is turned on based on the control information subjected to the first correction, that is, the second illumination state after the correction, with the third illumination state. Information processor 110 may calculate a difference between the second illumination state after the first correction and the third illumination state, which is a result of the comparison. Specifically, the difference here refers to differences between a brightness, a tone, and the like indicated by the second illumination state after the first correction and a brightness, a tone, and the like indicated by the third illumination state.

Information processor 110 optimizes the control information such that the calculated difference becomes zero. That is, information processor 110 further corrects the control information subjected to the first correction such that the second illumination state resembles or matches the third illumination state; that is, information processor 110 performs the second correction. The second illumination state based on the control information subjected to the first correction thereby resembles or matches the third illumination state.

Information processor 110 then transmits the control information subjected to the second correction to illumination device 2. The second illumination state in which the space is illuminated based on the control information subjected to the second correction is a state resembling the first illumination state or the third illumination state, which is an ideal state. By repeating the correction described above, it is possible to make the second illumination state resemble more the first illumination state or the third illumination state.

<User Interface 220>

User interface 220 is inputting means which inputs an illumination mode of illumination device 2 in response to an operation by a user. Specifically, user interface 220 receives, as the illumination mode of illumination device 2, operations regarding an illumination direction, a brightness of illuminating light, a color of illuminating light, an illumination pattern or a duration of light emission, and the like which are specified by the user. Based on the operations by the user received by user interface 220, information processor 110 generates the control information or obtains the control information from external device 300.

User interface 220 includes, for example, a touch panel having functions as a manipulator and a display. On the touch panel, a graphical user interface (GUI) screen suitable for touch operation by a user is displayed. User interface 220 is not limited to a touch panel and may include a display and a manipulator separately. In this case, the display is a display device such as a liquid crystal display device and an organic EL device, and the manipulator is an input device such as a mouse, a keyboard, a touchpad, a touch panel, and a microphone.

User interface 220 enables inputting of space information regarding the space in which illumination device 2 is to be installed and position information indicating a position at which illumination device 2 is to be installed inside the space. User interface 220 is an example of an information obtainer.

<Communicator 230>

Communicator 230 is a communication module having a function of communicating with illumination device 2 and the network. A method for communication by communicator 230 is, as with communicator 40 of illumination device 2, for example, a communication method such as LAN, power line communication, infrared communication, near field communication (e.g., Bluetooth (R) communication), and mobile communication for cellular phones.

Communicator 230 includes information transmitter 231 and information receiver 232.

Information transmitter 231 is a processor which transmits control information to illumination device 2. Information transmitter 231 includes a transmission circuit for transmitting the control information, and a connector or an antenna, and the like.

Information receiver 232 is, for example, a processor which obtains control information over the network. Information receiver 232 includes a reception circuit for receiving the control information, and a connector or an antenna, and the like.

<Storage 240>

Storage 240 can be used as a working memory for information processor 110. Storage 240 includes, for example, a primary storage device such as a RAM and a ROM. In addition, storage 240 may include a secondary storage device such as an HDD and an SSD and/or a tertiary storage device such as an optical disk and an SD card. Note that storage 240 may include another storage device. Storage 240 saves various kinds of data, information, programs, and the like. In addition, in storage 240, pieces of control information with which illumination modes of illumination device 2 or light emission modes of light sources 11 are brought about may be registered in advance.

[Operation]

Next, operation by illumination control system 1 will be described.

Figure 4:
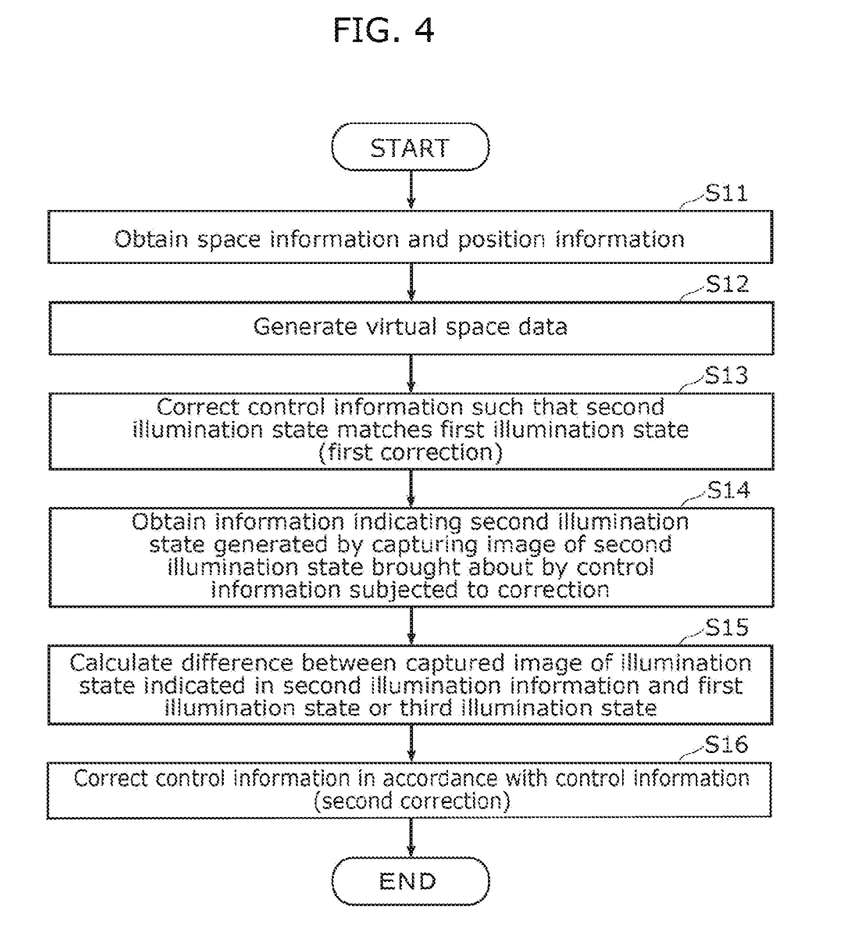
FIG. 4 is a flowchart illustrating an example of operation of illumination control system according to the embodiment.
Figure 5:
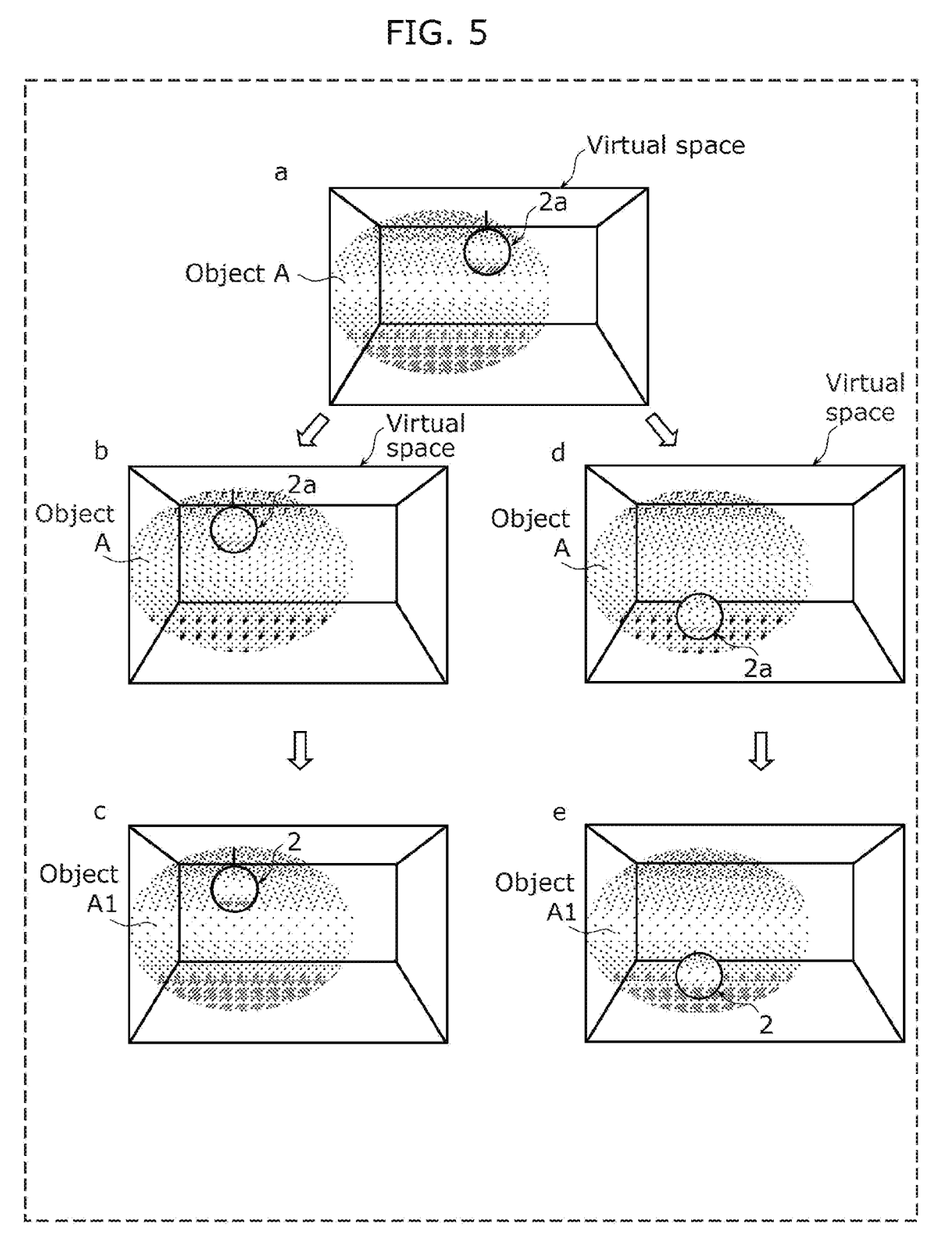
FIG. 5 is a schematic diagram exemplifying states of illumination of the illumination device according to the operation of the illumination control system according to the embodiment.

FIG. 4 is a flow chart illustrating an example of the operation by illumination control system 1 according to an embodiment. FIG. is a schematic diagram illustrating illumination states of illumination device 2 in accordance with the operation by illumination control system 1 according to an embodiment. Here, assume a case where illumination device 2 is installed in a room (the space) in which an object such as an article of furniture is installed.

As illustrated in FIG. 4, measurer 120 measures illumination device 2 and a space in which illumination device 2 is to be installed, so as to obtain space information regarding the space in which illumination device 2 is to be installed and position information indicating a position at which illumination device 2 is to be installed inside the space (S11). Measurer 120 measures the object forming the space in which illumination device 2 is installed. Based on images captured for measuring the space, measurer 120 calculates a shape, a size, and the like of the space, and generates the space information indicating the calculated shape, size, and the like of the space. For example, the space information includes information indicating shapes, sizes, and the like of a plurality of objects including a ceiling, a floor, a side wall forming the room, and equipment arranged on them. In addition, measurer 120 measures illumination device 2 installed in the space. Based on images captured for measuring illumination device 2, measurer 120 calculates three-dimensional coordinates being a position at which illumination device 2 is installed in the space, thereby generating the position information. Measurer 120 outputs the generated space information and position information to information processor 110.

Despite the above, information processor 110 may obtain the space information and the position information via user interface 220. That is, in this process, measurer 120 need not measure illumination device 2 and the like to obtain the space information and the position information.

Next, as illustrated in FIG. 4 and a in FIG. 5, information processor 110 generates virtual space data including a virtual space which simulates the space in which illumination device 2 is to be installed based on the obtained space information and including virtual illumination device 2a which is installed in the virtual space based on the obtained position information (S12). First, information processor 110 generates the virtual space which simulates an equivalent space based on a shape and a size of the space and a shape, a size, a position, and the like of each object which are indicated in the space information. Information processor 110 arranges, in the virtual space generated, virtual illumination device 2a at the position of illumination device 2 indicated in the position information and generates the virtual space data including virtual illumination device 2a arranged and the virtual space.

Next, in the generated virtual space data, information processor 110 calculates a first illumination state of light radiated from virtual illumination device 2a onto the virtual object to provide the desired illumination and generates information indicating the calculated first illumination state of the light radiated onto the irradiated surface. Information processor 110 further generates information indicating a second illumination state of a case where illumination device 2 installed at the position indicated in the position information is turned on based on the control information. As illustrated in FIG. 4, b in FIG. 5, and d in FIG. 5, information processor 110 compares the information indicating the second illumination state with the information indicating the first illumination state, thereby correcting the control information with which the second illumination state is presented such that a difference between the second illumination state and the first illumination state becomes small (first correction: S13). This will be described by way of example; a position of virtual illumination device 2a with which the first illumination state serving as master data is provided, which is illustrated in a in FIG. 5, is different from positions of virtual illumination device 2a which simulate a position of illumination device 2 installed actually, which are illustrated in b in FIG. 5 and d in FIG. 5. Therefore, for example, a distance from virtual illumination device 2a to object A illustrated in a in FIG. 5 is different from distances from virtual illumination device 2a to object A illustrated in b in FIG. 5 and d in FIG. 5, and thus a brightness, a tone, and the like of light radiated onto an irradiated surface of object A differ among a, b, and d in FIG. 5. That is, the second illumination state is different from the first illumination state. Hence, by correcting the second illumination state into the first illumination state, what are illustrated in b in FIG. 5 and d in FIG. 5 are brought about. Information processor 110 then transmits the control information subjected to the first correction via information transmitter 231 of communicator 230 to illumination device 2.

In addition, in place of the information indicating the first illumination state, measurer 120 generates information indicating a third illumination state of a case where illumination device 2 installed at a specified position in a specified space is turned on based on the control information. In this case, information processor 110 may compare the information indicating the second illumination state with the information indicating the third illumination state, thereby correcting the control information with which illumination device 2 is turned on in the second illumination state such that a difference between the second illumination state and the third illumination state becomes small (first correction: S13).

In the present embodiment, information processor 110 uses inverse-square law to correct the control information with which illumination device 2 is turned on in the second illumination state before the correction such that a difference between the second illumination state before the correction and the first illumination state or the third illumination state becomes small.

Specifically, based on the space information and the position information, information processor 110 calculates a distance from illumination device 2 to a given point on an irradiated surface of an object irradiated with light in the second illumination state before the correction. In addition, information processor 110 obtains information indicating the second illumination state before the correction (a brightness (illuminance), a tone, and the like at the given point on the irradiated surface of the object irradiated with light) via measurer 120, user interface 220, or the like. In addition, from the information indicating the simulated first illumination state, information processor 110 extracts a distance from illumination device 2 to the given point on the irradiated surface of the object irradiated with light in the first illumination state, and a brightness, a tone, and the like at the given point on the irradiated surface of the object irradiated with the light. For example, when the brightness at the given point in the second illumination state before the correction is lower or higher than the brightness at the given point in the first illumination state, information processor 110 corrects the control information so as to increase or decrease a brightness of light to be radiated to the given point.

Next, based on the control information subjected to the first correction by information processor 110, measurer 120 measures a second illumination state after the correction in which illumination device 2 installed in an actual space is turned on, thereby generates the second illumination state, and obtains information indicating the second illumination state (S14). That is, by measuring a space illuminated when illumination device 2 is turned on based on the corrected control information, measurer 120 generates the information indicating the second illumination state after the correction.

Next, information processor 110 obtains the information indicating the second illumination state from measurer 120. Information processor 110 calculates a difference between the second illumination state indicated in the information indicating the second illumination state and the first illumination state or the third illumination state (S15). Specifically, information processor 110 compares the second illumination state after the correction of a case where illumination device 2 is turned on based on the control information subjected to the first correction with the first illumination state indicated in the information indicating the first illumination state which is virtually generated by the simulation. Information processor 110 calculates a difference between the second illumination state after the first correction and the first illumination state, which is a result of the comparison.

Additionally, information processor 110 may compare the second illumination state after the correction of the case where illumination device 2 is turned on based on the control information subjected to the first correction with the third illumination state. Information processor 110 may calculate a difference between the second illumination state after the first correction and the third illumination state, which is a result of the comparison.

As illustrated in FIG. 4, c in FIG. 5, and e in FIG. 5, information processor 110 optimizes the control information such that the calculated difference becomes zero (S16). Information processor 110 further corrects the control information subjected to the first correction such that the second illumination state resembles or matches the first illumination state; that is, information processor 110 performs the second correction. By repeating the correction described above, it is possible to make the second illumination state resemble more the first illumination state or the third illumination state.

Illumination control system 1 thus ends the processing. In this way, a space illuminated with light emitted by illumination device 2 is provided with a desired illumination. For example, a brightness, a tone, and the like of light radiated onto an irradiated surface of object A illustrated in a in FIG. 5 becomes the same as a brightness, a tone, and the like of light radiated onto an irradiated surface of object A illustrated in each of c in FIG. 5 and e in FIG. 5.

[Effects]

Next, effects of illumination control system 1 according to the present embodiment will be described.

As described above, illumination control system 1 according to the present embodiment includes illumination device 2 which includes light sources 1 and illumination control device 3 which is capable of individually controlling the light emission of light sources 11. Illumination control device 3 includes: measurer 120 (information obtainer) which obtains space information regarding a space in which illumination device 2 is to be installed and position information indicating a position at which illumination device is to be installed inside the space; information transmitter 231 which transmits control information to illumination device 2; and information processor 110 which optimizes control information for controlling a lighting mode of each of light sources 11, according to an installation condition of illumination device 2 indicated in the space information and the position information.

For example, in a case where an illumination device is installed at a predetermined position in a space, even when the illumination device is turned on based on control information, a desired illumination cannot be provided in some environments (installation conditions) of the space in which the illumination device is installed. Specifically, in a case of an environment which lets outside light shine in easily or an environment which is difficult for outside light to shine in, an illumination effect of presenting the space based on the control information is changed due to an original brightness of the space. In addition, it may be impossible to provide the desired illumination in the space at some position at which the illumination device is installed. For example, an installation position of an object such as a wall with respect to the illumination device differs between a case where the illumination device is installed on a ceiling and a case where the illumination device is installed on a floor, and thus a brightness and the like of light radiated onto the object varies, which changes the illumination effect. As in these cases, it is difficult to provide a desired illumination state indicated in the control information even in a case where the illumination device obtains the control information.

However, with illumination control system 1 in the present embodiment, illumination control device 3 optimizes the control information in accordance with the position information on the position at which illumination device 2 is installed and the space information on the space in which illumination device 2 is installed. That is, the control information is optimized so that the desired illumination is provided even when the installation position of illumination device 2 is changed.

Therefore, even when illumination device 2 is installed in spaces having different installation conditions, illumination device 2 can perform the same illumination in the spaces.

Furthermore, in illumination control system 1 according to the present embodiment, information processor 110 further generates virtual space data including: a virtual space which simulates the space in which illumination device 2 is to be installed based on the space information obtained; and virtual illumination device 2a installed in the virtual space based on the position information obtained.

With this configuration, based on the space information, information processor 110 can accurately reproduce the virtual space which simulates the space, based on a shape and a size of the space, a shape and a size of each object forming the space, and the like. In addition, based on the position information, information processor 110 can also accurately reproduce a position of virtual illumination device 2a to be installed in the virtual space. As a result, it is possible to accurately generate the virtual space data for providing the desired illumination.

Furthermore, in illumination control system 1 according to the present embodiment, the virtual space is defined by a virtual object. In addition, information processor 110 further calculates a first illumination state of light radiated from virtual illumination device 2a onto an irradiated surface of the virtual object in the virtual space data generated, and generates information indicating the first illumination state of the light radiated onto the irradiated surface calculated.

With this configuration, the first illumination state can be accurately simulated with the virtual space data. As a result, it is possible to generate desired control information which serves as master data.

Furthermore, in illumination control system 1 according to the present embodiment, information processor 110 further optimizes the control information by correcting the control information to reduce a difference between the first illumination state and a second illumination state where illumination device 2 installed at the position indicated in the position information is turned on based on the control information.

With this configuration, the second illumination state can be made to match or resemble the first illumination state, which is the desired illumination state, and thus the desired illumination can be performed.

Furthermore, in illumination control system 1 according to the present embodiment, information processor 110 further optimizes the control information by correcting the control information to reduce a difference between a second illumination state where illumination device 2 installed at the position indicated in the position information is turned on based on the control information and a third illumination state where illumination device 2 installed at a specified position in a specified space is turned on based on the control information.

With this configuration, the second illumination state can be made to match or resemble the third illumination state, which is the desired illumination state, and thus the desired illumination can be performed.

Furthermore, in illumination control system 1 according to the present embodiment, information processor 110 optimizes the control information by correcting the control information using inverse-square law.

With this configuration, the control information can be properly optimized such that the second illumination state is made to match or resemble the first illumination state or the third illumination state.

Furthermore, in illumination control system 1 according to the present embodiment, the information obtainer is measurer 120.

Measurer 120 obtains the space information and the position information by measuring illumination device 2 and the space in which illumination device 2 is to be installed.

With this configuration, by measuring the space and illumination device 2 with measurer 120, illumination control device 3 can properly obtain the space information and the position information.

Furthermore, in illumination control system 1 according to the present embodiment, the space is formed by an object. Moreover, the information obtainer is measurer 120. Measurer 120 obtains information which indicates the second illumination state and is generated by measuring the second illumination state where illumination device 2 installed at a position indicated in the position information is turned on based on control information that has been optimized. In addition, information processor 110 further calculates a difference between the first illumination state and the second illumination state indicated by the information indicating the second illumination state, and optimizes the control information by correcting the control information to eliminate the difference calculated.

Furthermore, in illumination control system 1 according to the present embodiment, the space is formed by an object. Moreover, the information obtainer is measurer 120. Measurer 120 obtains information which indicates the second illumination state and is generated by measuring the second illumination state where illumination device 2 installed at a position indicated in the position information is turned on based on control information that has been optimized. In addition, information processor 110 further calculates a difference between the third illumination state and the second illumination state indicated by the information indicating the second illumination state, and optimizes the control information by correcting the control information to eliminate the difference calculated.

As in these cases, for example, in a case where an illumination device is installed at a predetermined position in a space, even when the illumination device is turned on based on control information, a desired illumination cannot be provided in some environments of the space in which the illumination device is installed. Specifically, in a case where light from a peripheral illumination device or natural light through a window is incident, a case where an object reflecting light well, such as a mirror, is installed, a case where an object which is a member absorbing light actively is installed, or the like, an illumination effect of presenting the space based on the control information is changed.

However, with illumination control system 1 in the present embodiment, information processor 110 further corrects the control information subjected to the first correction. That is, the second illumination state after the correction, with which illumination device 2 is turned on based on the control information subjected to the first correction, is further corrected. As a result, the second illumination state can be made to match or resemble the first illumination state or the third illumination state, which is the desired illumination state, and it is thus possible to perform the desired illumination more reliably.

Furthermore, in illumination control system 1 according to the present embodiment, light sources 11 are arranged at specified intervals. In addition, an interval between two adjacent light sources among light sources 11 is at most twice an average interval and at least half the average interval, the average interval being an average of all intervals between two adjacent light sources among light sources 11.

With this configuration, light sources 11 are arranged at specified intervals, which makes it easy to provide the desired illumination.

Furthermore, in illumination control system 1 according to the present embodiment, illumination device 2 illuminates in all directions using light sources 11.

With this configuration, it will be easier to provide the desired illumination even when illumination device 2 is installed in spaces having different installation conditions.

Furthermore, illumination control system 1 according to the present embodiment further includes communicator 230 which transmits the control information to external device 300.

With this configuration, external device 300 can obtain the optimized control information.

(Other Variations)

Although the illumination control system according to the present disclosure has been described above based on the foregoing exemplary embodiments, the present disclosure is not limited to such embodiments. Forms obtained by various modifications to the foregoing embodiments that can be conceived by those skilled in the art without departing from the essence of the present disclosure may be included within the scope of the present disclosure.

For example, each unit included in the illumination control system according to the foregoing embodiments is typically implemented as an LSI which is an integrated circuit. They may take the form of individual chips, or some or all of them may be encapsulated into a single chip.

Furthermore, the integrated circuit is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the foregoing embodiments, each of the structural components may be implemented as dedicated hardware or may be realized by executing a software program suited to such structural components. Alternatively, each of the structural components may be implemented by a program executor such as a CPU or a processor reading out and executing the software program recorded in a recording medium such as a hard disk or a semiconductor memory.

Furthermore, all numerical values used above are mere examples for specifically describing the present disclosure, and thus embodiments of the present disclosure are not limited by these exemplary numerical values.

Furthermore, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Moreover, the functions of a plurality of functional blocks having similar functions may be processed by single hardware or software in a parallelized or time-divided manner.

Furthermore, the order of executing the steps shown in the flowcharts is a mere illustration for specifically describing the present disclosure, and thus may be an order other than the shown order. Also, one or more of the steps may be executed simultaneously (in parallel) with another step.

It should be noted that the present disclosure includes forms obtained by making various modifications to the foregoing embodiments that can be conceived by those skilled in the art, as well as forms realized by arbitrarily combining structural components in different embodiments, without materially departing from the spirit of the present disclosure.

The invention claimed is:

1. An illumination control system, comprising:
   an illumination device including a plurality of light sources; and
   an illumination control device capable of individually controlling light emission of the plurality of light sources, the illumination control device including:
   an information obtainer which obtains space information regarding a space in which the illumination device is to be installed and position information indicating a position at which the illumination device is to be installed inside the space;
   an information transmitter which transmits control information to the illumination device; and
   an information processor which optimizes control information for controlling a lighting mode of each of the plurality of light sources, according to an installation condition of the illumination device indicated in the space information and the position information.

2. The illumination control system according to claim 1, wherein
   the information processor further generates virtual space data including:
   a virtual space which simulates the space in which the illumination device is to be installed based on the space information obtained; and
   a virtual illumination device installed in the virtual space based on the position information obtained.

3. The illumination control system according to claim 2, wherein
   the virtual space is defined by a virtual object, and
   the information processor further calculates a first illumination state of light radiated from the virtual illumination device onto an irradiated surface of the virtual object in the virtual space data generated, and generates information indicating the first illumination state of the light radiated onto the irradiated surface calculated.

4. The illumination control system according to claim 3, wherein
   the information processor further optimizes the control information by correcting the control information to reduce a difference between the first illumination state and a second illumination state where the illumination device installed at the position indicated in the position information is turned on based on the control information.

5. The illumination control system according to claim 1, wherein
   the information processor further optimizes the control information by correcting the control information to reduce a difference between a second illumination state where the illumination device installed at the position indicated in the position information is turned on based on the control information and a third illumination state where the illumination device installed at a specified position in a specified space is turned on based on the control information.

6. The illumination control system according to claim 4, wherein
the information processor optimizes the control information by correcting the control information using inverse-square law.

7. The illumination control system according to claim 2, wherein
the information obtainer is a measurer and obtains the space information and the position information by measuring the illumination device and the space in which the illumination device is to be installed.

8. The illumination control system according to claim 4, wherein
the space is formed by an object,
the information obtainer is a measurer and obtains information generated by measuring the second illumination state where the illumination device installed at a position indicated in the position information is turned on based on control information that has been optimized, the information indicating the second illumination state, and
the information processor further:
calculates a difference between the first illumination state and the second illumination state indicated by the information indicating the second illumination state; and
optimizes the control information by correcting the control information to eliminate the difference calculated.

9. The illumination control system according to claim 5, wherein
the space is formed by an object,
the information obtainer is a measurer and obtains information generated by measuring the second illumination state where the illumination device installed at a position indicated in the position information is turned on based on control information that has been optimized, the information indicating the second illumination state, and
the information processor further:
calculates a difference between the third illumination state and the second illumination state indicated by the information indicating the second illumination state; and
optimizes the control information by correcting the control information to eliminate the difference calculated.

10. The illumination control system according to claim 1, wherein
the plurality of light sources are arranged at specified intervals, and
an interval between two adjacent light sources among the plurality of light sources is at most twice an average interval and at least half the average interval, the average interval being an average of all intervals between two adjacent light sources among the plurality of light sources.

11. The illumination control system according to claim 1, wherein
the illumination device illuminates in all directions using the plurality of light sources.

12. The illumination control system according to claim 1, further comprises:
a communicator which transmits the control information to an external device.

* * * * *